United States Patent Office 3,838,083

Patented Sept. 24, 1974

3,838,083

OIL- AND WATER-REPELLENT COMPOSITION OF PERFLUOROALKYL ACRYLATES OR METHACRYLATES

Hiroshi Ukihashi, Tokyo, and Kazusuke Kirimoto and Hiroaki Kojima, Yokohama, Japan, assignors to Asahi Glass Company, Ltd., Tokyo, Japan No Drawing. Filed Sept. 8, 1972, Ser. No. 287,517
Int. Cl. C08f *15/40, 45/24*
U.S. Cl. 260—29.6 F 6 Claims

ABSTRACT OF THE DISCLOSURE

An improved oil- and water-repellent copolymer composition which comprises at least 25 weight percent of a fluoroalkyl monomer, 5–50 weight percent vinylchloride and a diester monomer having the formula:

$$R_1O_2C—CH=CH—CO_2R_2$$

wherein $R_1$ and $R_2$ may be the same or different and represent $C_{1-18}$ alkyl groups.

BACKGROUND OF THE INVENTION

Field Of The Invention

This invention relates to an improved oil- and water-repellent composition. More particularly, it relates to an improved oil- and water-repellent composition which consists of a copolymer containing units of vinylchloride and units of a polymerizable fluoroalkyl monomer.

Description Of The Prior Art

Heretofore, oil- and water-repellent compositions have been known which consist of a polymer prepared from a fluoroalkyl monomer such as acrylic acid or methacrylic acid ester containing a perfluoroalkyl group, or a copolymer prepared by the polymerization of a fluoroalkyl monomer and a monomer such as acrylic ester, maleic anhydride, chloroprene, butadiene or methylvinyl-ketone. However, while the conventional oil- and water-repellent compositions possess a satisfactory oil-repellency, they do not have a sufficient water-repellency. Thus, conventional fluorine containing oil- and water-repellent compounds have been used with various quaternary pyridinium salts or paraffin waxes to achieve an oil-repellent compound having sufficient water-repellent properties.

Recently, oil- and water-repellent compositions have been found which consist of a copolymer prepared by the copolymerization of vinylchloride and a fluoroalkyl monomer at a specific rate. The copolymers containing vinylchloride units and fluoroalkyl monomers units have excellent oil-repellency and water-repellency and also an improved stain-repellency. Thus, their usefulness as oil- and water-repellent compounds is improved. However, it has been found that these oil- and water-repellent compositions, when used to treat fibrous fabrics, have difficulty imparting the improved characteristics required in the fabrics when applied in small quantities. For example, a sufficient water-repellency can be imparted to fabric by the application of large quantities of the oil- and water-repellent compositions. However, when small quantities of the oil- and water-repellent compositions are applied to fabrics, fabrics possessing an insufficient water-repellency result. Water-repellent fabrics are prepared by a latex dipping method with a heat-treating step.

SUMMARY OF THE INVENTION

Accordingly, it is an object of this invention to provide an improved oil- and water-repellent composition which can impart an excellent degree of water-repellency to fabrics by application in small amounts.

Briefly, this object and other objects of this invention can be achieved by copolymerizing 5–50 weight percent vinylchloride and at least 25 weight percent of a fluoroalkyl monomer together with a diester monomer having the formula:

$$R_1OOC—CH=CH—COOR_2$$

wherein $R_1$ and $R_2$ represent $C_{1-18}$ alkyl groups.

DETAILED DESCRIPTION OF THE PREFERRED EMBODIMENTS

It is not clear why water-repellency is improved by the copolymerization of a specific monomer such as dioctylmaleate together with a fluoroalkyl monomer and vinylchloride. However, copolymers containing fluoroalkyl monomer units and vinylchloride units have high softening points and melt indices. These properties can be improved by the copolymerization of a specific diester monomer with vinylchloride and a fluoroalkyl monomer. The resulting composition imparts excellent oil- and water-repellent characteristics when applied to fabrics.

The amount of vinylchloride in the compositions can be varied depending upon the types and quantities of polymerizable, fluoroalkyl monomer and diester monomer used. If the amount of vinylchloride used is less than 5 weight percent, no improvement in the water-repellency and the stain-repellency of the composition results. If the amount of vinylchloride used is more than 50 weight percent, the water-repellency and the stain-repellency decrease and also the oil-repellency is lost. Optimum water-, oil- and stain-repellency in the product compositions are achieved when 10–35 weight percent vinylchloride is used in the synthesis of the compositions.

The diester monomers employed in this invention have the formula:

$$R_1OOC—CH=CH—COOR_2 \quad (1)$$

wherein $R_1$ and $R_2$ may be the same or different and represent $C_{1-18}$ alkyl groups. Suitable examples include dimethylmaleate, diethylmaleate, dibutylmaleate, dioctylmaleate, methylbutylmaleate, diamylmaleate, dimethylamylmaleate, dibutylfumarate and dioctylfumarate. Generally, compositions possessing improved characteristics are obtained when diester monomers are used which contain $R_1$ and $R_2$ groups having a relatively high number of carbon atoms. On the other hand, the synthesis of the copolymers is relatively easy when the diester monomers used contain $R_1$ and $R_2$ groups having a relatively small number of carbon atoms. It has been found that from 2–10 carbon atoms is a suitable range for the $R_1$ and $R_2$ groups.

The amount of diester monomer employed in the compositions depends upon the amount of vinylchloride and the type of diester monomer used. Usually, quantities in the range of 0.5–0.01 mole, especially 0.2–0.02 mole, of a diester such as dioctylmaleate are used per mole of vinylchloride. If the amount of the diester monomer employed is too small, no appreciable improvements in the properties of the product compositions result. On the other hand, if the amount of the diester monomer employed is too high, the water-repellency of the product is decreased. The fluoroalkyl monomers used in this invention, can be any of the conventional monomers used in this copolymerization, and include unsaturated esters such as acrylates and methacrylates containing $C_{3-15}$ perfluoroalkyl groups. Suitable examples include:

$CF_3(CF_2)_7(CH_2)_{11}OCOCH{=}CH_2$, $CF_3(CF_2)_4CH_2OCOC(CH_3){=}CH_2$,

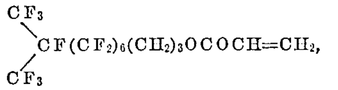

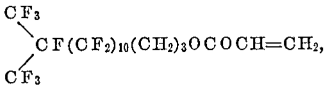

$CF_3(CF_2)_6(CH_2)_2OCOC(CH_3){=}CH_2$,

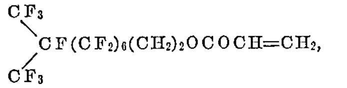

$CF_3(CF_2)_7SO_2N(C_3H_7)(CH_2)_2OCOCH{=}CH_2$, $CF_3(CF_2)_7(CH_2)_4OCOCH{=}CH_2$, $CF_3(CF_2)_7SO_2N(CH_3)(CH_2)_2OCOC(CH_3){=}CH_2$, $CF_3(CF_2)_7(CH_2)_3COOCH{=}CH_2$,

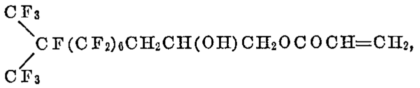

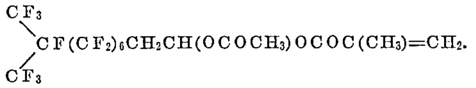

Other suitable fluoroalkyl monomers include:

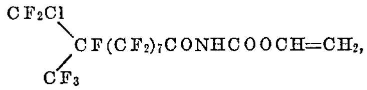

$H(CF_2)_{10}CH_2OCOCH{=}CH_2$, $CF_2Cl(CF_2)_{10}CH_2OCOC(CH_3){=}CH_2$.

Other fluoroalkyl monomers, which are copolymerizable with vinylchloride, may also be used in addition to those preferred.

Preferably, in view of the commercial uses and availability of perfluoroalkyl monomers, copolymerizable fluoroalkyl monomers such as perfluoroalkyl acrylic acid esters or methacrylic acid esters having the formula:

$$R_fROCOCR'{=}CH_2$$

wherein $R_f$ represents straight or branched chain perfluoroalkyl groups having $C_{3-15}$ carbon atoms, R represents straight or branched chain alkylene groups having $C_{1-10}$ carbon atoms, and R′ represents hydrogen or a methyl group, are used. The amount of fluoroalkyl monomers used in relation to the total monomer content is at least 25 weight percent, preferably 45 weight percent. In addition to the fluoroalkyl monomers mentioned, other polymerizable, non-fluoroalkyl containing monomers can be copolymerized with vinylchloride and a diester monomer. Suitable monomers include ethylene, vinylacetate, vinylfluoride, vinylidenehalide, acrylonitrile, styrene, α-methylstyrene, p-methylstyrene, acrylic acid, alkyl acrylate, methacrylic acid, alkyl methacrylate, acrylamide, methacrylamide, diacetone acrylamide, methylol diacetone acrylamide, vinylalkylether, vinylalkylketone, butadiene, isoprene, chloroprene, glycidyl acrylate, maleic anhydride, and mixtures thereof.

When a non-fluoroalkyl containing monomer is polymerized with the three other monomers components of this invention, compositions possessing improved dry-cleaning resistance, washing resistance solubility, hardness, hand feel and the like, result. In addition, the degree of oil- and water-repellency and stain-repellency is improved. For example, when styrene or acrylic acid or methacrylic acid alkyl ester is copolymerized with the three types of monomers of this invention, a product is obtained which has a selective solubility to certain organic solvents such as methylchloroform and trichlorotrifluoroethane. Thus, the oil- and water-repellent compositions can be used as an aerosol or as a solution. When diacetoneacrylamide or methylol diacetone-acrylamide is copolymerized with the three types of monomers of this invention, a product is obtained which has improved fastness, dry-cleaning resistance and washing resistance. Preferably, less than 20 weight percent of the non-fluoroalkyl containing monomer to the total monomer content is used in these compositions.

In order to prepare the copolymers of this invention, various types and conditions of polymerization reactions can be employed. Any of the mass polymerization, solution polymerization, suspension polymerization, emulsion polymerization, radiation polymerization and photopolymerization techniques can be employed. For example, a mixture of the monomers is emulsified in water in the presence of a surface active agent and then copolymerized with stirring. Polymerization initiators can also be used in the reaction medium. Suitable examples include benzoyl peroxide, lauroyl peroxide, t-butyl perbenzoate, 1-hydroxy cyclohexyl hydroperoxide, 3-carboxypropionyl peroxide, acetylperoxide, azobis - isobutylamidine - 2-hydrochloride, azobisisobutyronitrile, sodium peroxide, potassium persulfate and ammonium persulfate. The reaction can also be initiated by exposure to ionizing radiation such as γ-rays.

The surface active agent used is selected from many types of anionic, cationic and nonionic emulsifiers. Suitable anionic emulsifiers include sodium $C_{16-18}$ alkenyl sulfate acetate, sodium oleate, sodium oleate methylsulfate, ammonium ω-H-polyfluoro-alkanoate containing 8–10 carbon atoms, ammonium fluoroalkanoate, sodium $C_{10-18}$ alkylsulfate, sodium $C_{12-18}$ alkylbenzenesulfonate and sodium alkylnaphthalenesulfonate. Suitable cationic emulsifiers include dodecylmethylbenzyl trimethyl ammonium chloride, benzyl dodecyl dimethyl ammonium chloride, N-[2 - (diethylamino)ethyl]-oleylamide hydrochloride, dodecyltrimethyl ammonium acetate, trimethyl tetradecyl ammonium chloride, hexadecyl trimethyl ammonium chloride and trimethyl octadecyl ammonium chloride. Suitable nonionic emulsifiers include polyoxyethylene hexylphenol, isooctylphenol, nonylphenol, $C_{12-18}$ higher fatty alcohol ethers, polyoxyethylene $C_{12-18}$ higher fatty acid esters, polyoxyethylene $C_{12-16}$ alkanethiol, polyoxyethylene $C_{12-18}$ alkylamine, and polyoxyethylene sorbitane alkanoate.

The monomers may be dissolved in a suitable organic solvent, and the polymerization conducted in solution in the presence of a polymerization initiator such as a soluble peroxide, an azo compound or by ionizing radiation. Suitable organic solvents include tetrachlorodifluoroethane, methylchloroform, and the like. Various aerosol, organic solvent type or latex type oil- and water-repellent compositions can be directly prepared by solution polymerization or emulsion polymerization.

The oil- and water-repellent compositions containing the copolymers can be prepared as an emulsion, a solution, an aerosol, etc. by any conventional method. For example, an aqueous emulsion composition can be directly prepared by emulsion polymerization, and a solution composition can be directly prepared by solution polymerization. Solution compositions can also be prepared by dissolving the copolymer prepared by mass polymerization or emulsion polymerization in a suitable organic solvent such as acetone, methylethylketone, diethyl ether, methylchloroform, trichloroethylene, tetrachloroethylene, chlorofluorohydrocarbons such as tetrachlorodifluoroethane, trichlorotrifluoroethane, or mixtures thereof. Aerosol compositions can also be prepared by packing a solution of the composition with a propellant such as dichlorodifluoromethane, monofluorotrichloromethane, dichlorotetrafluoroethane, and the like in a can.

The oil- and water-repellent composition of this invention can be applied by various methods depending upon the form of the composition and the type of articles treated. For example, when the composition is an aqueous emulsion or a solution composition, the composition is coated on the surface of an article by a conventional dip coating method or any other coating method and is dried. If necessary, certain cross-linking agents may be added to cure the composition. If the oil- and water-repellent composition is used as an aerosol, it may be sprayed on an article and dried to leave a satisfactory oil-, water- and stain-repellent article.

It is possible to apply the oil- and water-repellent compositions of this invention together with other water-repellent compositions and oil-repellent compositions containing insecticides, flameproofing agents, antielectrostatic agents, dye fixing agents, shrink-proofing agents, and the like. The types of articles treated by the oil- and water-repellent compositions of this invention are not limited, and can be fibrous fabrics, glass, paper, wood, leather, wool, asbestos, brick, cement, metal, metal oxides, ceramics, plastics, coating surfaces and plaster. The fibrous fabric can be made of natural fibers such as cotton, hemp, wool, silk; synthetic fibers such as polyamides, polyesters, polyvinylalcohols, polyacrylonitriles, polyvinylchlorides, polypropylenes, polytetrafluoroethylenes; semi-synthetic fibers such as rayon, acetate and glass fibers; and mixtures thereof.

Having generally described the invention, a more complete understanding can be obtained by reference to certain specific examples, which are included herein for purposes of illustration only and are not intended to be limiting unless otherwise specified. In the examples, water-repellency and oil-repellency are shown by the following standards. Water-repellency is measured by the Japan Industrial Standard L-1005 spray method, and is placed on a scale which is shown in Table I. Oil-repellency of the compositions is measured by the falling drop method in various mixtures of n-heptane and Nujol in the ratios shown in Table II. The drop is observed over a period of 3 minutes, and the results are placed on a scale as shown in Table II.

TABLE I

| Water repellency: | Condition |
|---|---|
| 100 | No wetting of the surface. |
| 90 | Small wetting of the surface. |
| 80 | Visible wetting of the surface. |
| 70 | Partial wetting of the surface. |
| 50 | Full wetting of the surface. |
| 0 | Complete wetting of both surfaces. |

TABLE II

| | Composition, percent volume | |
|---|---|---|
| Oil-repellency | n-Heptane | Nujol |
| 150 | 100 | 0 |
| 140 | 90 | 10 |
| 130 | 80 | 20 |
| 120 | 70 | 30 |
| 110 | 60 | 40 |
| 100 | 50 | 50 |
| 90 | 40 | 60 |
| 80 | 30 | 70 |
| 70 | 20 | 80 |
| 60 | 10 | 90 |
| 50 | 0 | 100 |
| 0 | 100% Nujol is not held | |

In the following examples, the + symbol next to some numbers indicates a number slightly higher than the base number.

EXAMPLES 1-5 AND REFERENCE 1

To a 2 liter autoclave made of metal SUS-27 which is equipped with a thermostat and an electromagnet stirrer, is added 640 g. of deoxygenated pure water, 256 g. of acetone, 0.32 g. of n-hexadecyl mercaptan, 3.2 g. of azobisisobutylamidine-2-hydrochloride, 16 g. of $$C_{17}H_{33}COO(CH_2-CH_2O)_{14}H,$$

237 g. of $$CF_3(CF_2)_nCH_2CH_2OCOCH=CH_2$$

(which is a mixture of components wherein the ratio of $n=4, 6, 8$ and 10 is 4:3:2:1), 5.8 g. of methylol diacetoneacrylamide, and the following specific additives. The mixture was stirred under a nitrogen gas flow until it was sufficiently emulsified and dispersed. The types and amounts of the specific additives used were as follows:

| | Specific additive | Amt., g. |
|---|---|---|
| Example: | | |
| 1 | Diethylmaleate | 16 |
| 2 | Dibutylmaleate | 16 |
| 3 | Dioctylmaleate | 16 |
| 4 | Dibutylfumarate | 16 |
| 5 | Dioctylfumarate | 16 |
| Reference 1 | No additive | |

After flushing the mixture by the introduction of nitrogen gas, 64 g. of vinylchloride (in the Reference 80 g. of vinylchloride) was charged from a small size bomb. The temperature of the autoclave was gradually raised while stirring, and the mixture was copolymerized at 55° C. for 15 hours. According to gas chromatographic analyses, conversions were in the range of 99.0–99.8% based on the polymerizable, fluoroalkyl monomer. The yields of the stable emulsion latex to the total monomers were in the range of 95–98%. Oil- and water-repellency were tested by using a latex solution containing 12 weight percent of the resulting solid copolymer. Latex solutions were diluted with water to give several solutions having a latex-to-water ratio of 0.75%, 0.5% and 0.3%. Oil- and water-repellency was measured for each solution.

In the tests, a polyester fiber fabric was treated as follows: Fabric samples were dipped in each one of the diluted latex solutions for two minutes and were squeezed between two rubber rollers until each sample was 80% saturated. The fabrics were dried at 100° C. for three minutes and heated at 150° C. for 3/2 minutes. The oil- and water-repellency of the treated fabrics were measured, and the results are shown in Table III. According to the minimum filming temperature (MFT) measurements of the latex of the Reference and Example 3, the former was 50° C. and the latter was 40° C.

TABLE III

| | Oil-repellency/water-repellency | | |
|---|---|---|---|
| | 0.3% | 0.5% | 0.75% |
| Example: | | | |
| 1 | 90+/70+ | 110/90 | 120/100 |
| 2 | 100/80 | 110+/90-90+ | 120+/100 |
| 3 | 100/80-80+ | 100+/90+-100 | 120+/100 |
| 4 | 80+/80 | 110/90+ | 110+/100 |
| 5 | 80/80 | 100/90-90+ | 110+/100 |
| Reference 1 | 70/60 | 110/80-80+ | 120/100 |

EXAMPLES 6-11

In accordance with Example 1, four component copolymer compositions were synthesized from a polymerizable mixture of a fluoroalkyl monomer, vinylchloride, methylol diacetone-acrylamide, and dioctylmaleate. In the preparation of several copolymer compositions, 74 weight percent of the polymerizable fluoroalkyl monomer was used with the quantities of vinylchloride and dioctylmaleate shown in Table IV. Oil- and water-repellency were measured as shown in Example 1. The results are shown in Table IV.

TABLE IV

| | Ratio of VC/DOM (percent) | DOM/VC (molar ratio) | Oil-repellency/water-repellency | |
|---|---|---|---|---|
| | | | 0.5% | 0.75% |
| Example: | | | | |
| 6 | 15/10 | 0.12 | 120/80+ | 120+/100 |
| 7 | 17/8 | 0.09 | 110+/90-90+ | 120+/100 |
| 8 | 21/4 | 0.035 | 110/100 | 120+/100 |
| 9 | 22/3 | 0.025 | 110+/100 | 130/100 |
| 10 | 23/2 | 0.016 | 110+/90 | 120+/100 |
| 11 | 24/1 | 0.008 | 110/90-90+ | 120/100 |

In Table IV, VC represents vinylchloride and DOM represents dioctylmaleate.

(REFERENCE 2)

The composition of Reference 2 was prepared from the same materials used in Example 11, except that maleic anhydride was used instead of dioctylmaleate. As a result, the yield of latex was 94.6% and the water-repellency of the fabric treated with a 0.5% diluted latex solution was 50.

EXAMPLES 12 AND REFERENCE 3

As shown in the preparations of Example 3 and Reference 1, the same monomers were copolymerized with the exception of methylol diactoneacrylamide. Oil- and water-repellency were tested by using a latex. The results are shown in Table V. When methylol diactoneacrylamide was used in the composition, the same results were found as the case in which no methylol diacetoneacrylamide was used.

TABLE V

| | Ratio of FA/VC /DOM | Oil-repellency/Water-repellency | | |
|---|---|---|---|---|
| | | 0.3% | 0.5% | 0.75% |
| Example 12 | 75/20/5 | 90+/80+ | 110/100 | 120+/100 |
| Reference 3 | 75/25/0 | 70+/50 | 100/80 | 110/90+-100 |

NOTE.—FA represents the polymerizable, fluoroalkyl monomer composition; VC represents vinylchloride; DOM represents dioctylmaleate.

EXAMPLES 13–17

In accordance with the preparative procedure of Example 9, the same monomers were copolymerized except that the molar ratio of DOM/VC was 0.025 and the total amounts of VC and DOM were selected as shown in Table VI. The amount of polymerizable, fluoroalkyl monomer composition used was 99-(VC+DOM) weight percent, and the amount of methylol diacetoneacrylamide used was 1 weight percent. In accordance with the analytical procedures of Example 1, the oil- and water-repellency of the treated fabric was tested. The results are shown in Table VI.

TABLE VI

| | VC+ DOM (percent) | Oil-repellency/Water-repellency | |
|---|---|---|---|
| | | 0.5% | 0.75% |
| Example: | | | |
| 13 | 15 | 110/90-90+ | 120/100 |
| 14 | 20 | 110/100 | 130/100 |
| 15 | 30 | 100+/90+ | 120/100 |
| 16 | 40 | 90+/80+-90 | 110/100 |
| 17 | 60 | 90/70 | 100+/90 |

EXAMPLES 18–20

In accordance with the preparative procedure of Example 17, the same monomers were copolymerized except that the amount of VC+DOM used was 60 weight percent and the molar ratios of DOM/VC were changed as shown in Table VII. Oil- and water-repellency were tested, and the results are shown in Table VII.

TABLE VII

| | DOM/VC (molar ratio) | Water-repellency | |
|---|---|---|---|
| | | 0.5% | 0.75% |
| Example: | | | |
| 18 | 0.2 | 80 | 90-95+ |
| 19 | 0.1 | 90 | 90+ |
| 20 | 0.05 | 80 | 90 |

It was found that the oil- and water-repellency were increased by increasing the molar ratio of DOM/VC when the amount of vinylchloride used in the copolymer was increased.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. An aqueous oil- and water-repellent composition which comprises in polymerized units at least 25 weight percent of an acrylate or methacrylate ester containing $C_{3-15}$ perfluoroalkyl groups or $$H(CF_2)_{10}CH_2OCOCH{=}CH_2,$$

5–50 weight percent vinylchloride and 0.01–0.5 mole of a diester monomer per mole of said vinylchloride having the formula: $R_1OOC{-}CH{=}CH{-}COOR_2$, wherein $R_1$ and $R_2$ may be the same or different and represent $C_{1-18}$ alkyl groups.

2. The oil- and water-repellent composition of Claim 1, wherein said diester monomer is dimethylmaleate, diethylmaleate, dibutylmaleate, dioctylmaleate, methylbutylmaleate, diamylmaleate, dimethylamylmaleate, dibutylfumarate, or dioctylfumarate.

3. The oil- and water-repellent composition of Claim 1, wherein 0.01–0.5 mole of said diester monomer per mole of vinylchloride is copolymerized with said polymerizable fluoroalkyl monomer present in a quantity which is at least 25 weight percent of the total monomer quantity.

4. The oil- and water-repellent composition of Claim 1, wherein a copolymerizable monomer is polymerized with and is different from said fluoroalkyl monomer, said vinylchloride and said diester monomer.

5. The oil- and water-repellent composition of Claim 1, wherein the composition is an emulsion prepared by the emulsion copolymerization of a polymerizable, fluoroalkyl monomer, vinylchloride, and a diester monomer.

6. The oil- and water-repellent composition of Claim 1, wherein the composition is a solution prepared by the solution polymerization of a fluoroalkyl monomer, vinylchloride and a diester monomer.

References Cited

UNITED STATES PATENTS

| | | | |
|---|---|---|---|
| 3,277,039 | 10/1966 | Marascia et al. | 260—29.6 F |
| 3,532,659 | 10/1970 | Hager et al. | 260—29.6 F |
| 3,575,940 | 4/1971 | Katsushima et al. | 260—29.6 F X |
| 3,592,686 | 7/1971 | Barber et al. | 260—29.6 F X |

LUCILLE M. PHYNES, Primary Examiner

U.S. Cl. X.R.

117—132 CF, 139.5 A, 161 UZ, UT; 260—29.6 T, 33.8 UA, 78.5 Cl, 32.8 R